July 4, 1961 J. E. C. ANDERSON ET AL 2,990,724
INTERNAL-EXTERNAL GEARS
Original Filed April 6, 1956 2 Sheets-Sheet 1
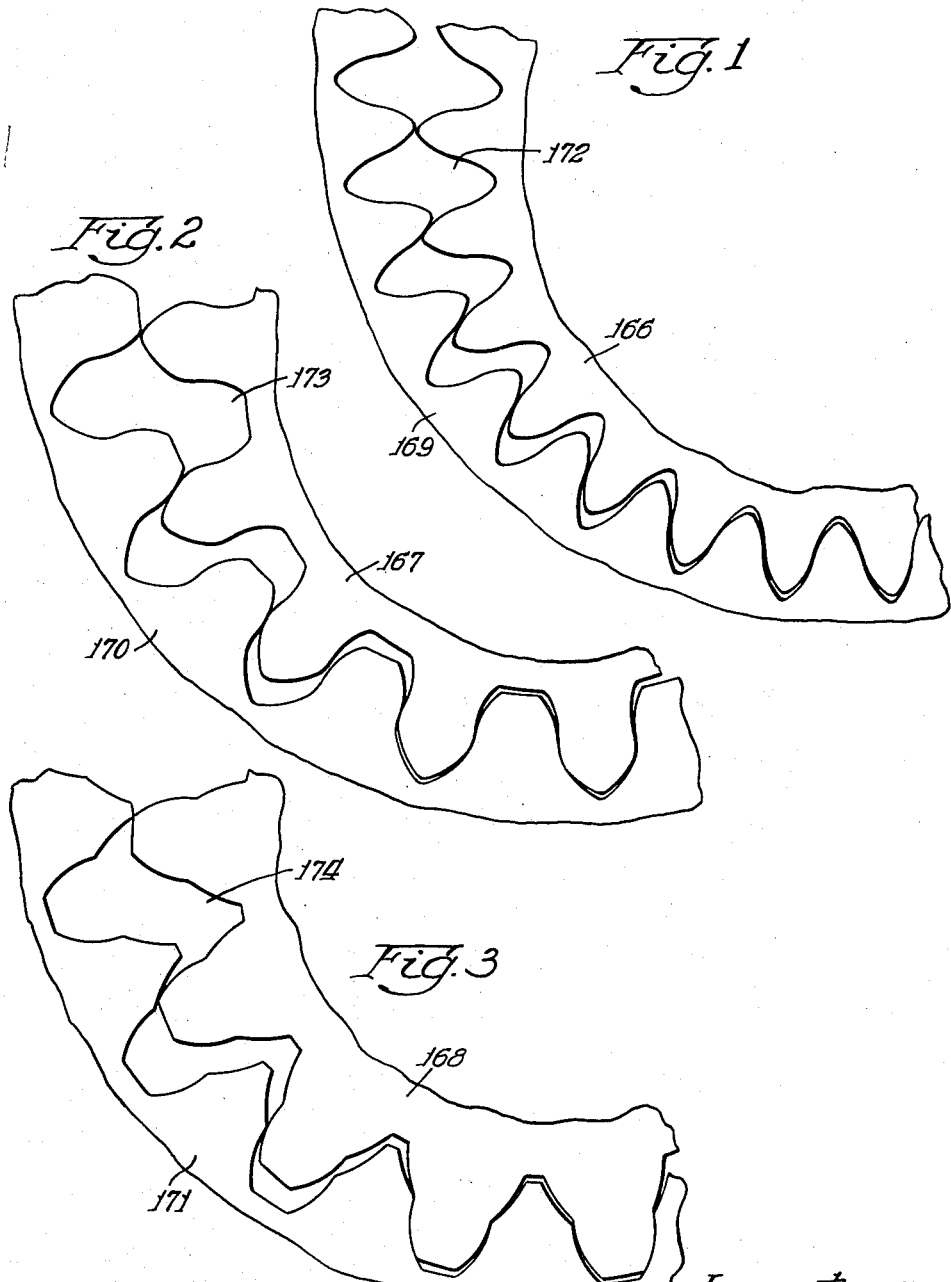
Inventors:
J. Edward C. Anderson
and Fred C. Haberland
By: Frank C. Parker
Atty Inventors:
J. Edward C. Anderson
and Fred C. Haberland
By: Frank C. Parker Atty.

United States Patent Office 2,990,724
Patented July 4, 1961

2,990,724
INTERNAL-EXTERNAL GEARS
J. Edward C. Anderson and Frederick C. Haberland, Cleveland, Ohio, assignors to Borg-Warner Corporation, Chicago, Ill., a corporation of Illinois
Original application Apr. 6, 1956, Ser. No. 576,568. Divided and this application Nov. 18, 1957, Ser. No. 697,023
5 Claims. (Cl. 74—462)

This application relates to a fluid pump or a fluid operated motor including intermeshing internal-external gears, the external gear being smaller than the internal gear and being mounted eccentrically thereto. This is a division of our co-pending application Serial No. 576,568, filed April 6, 1956.

The object of the present invention is to provide particular internal and external toothed gear members whereby when each tooth of the externally toothed gear comes into meshing relationship between an adjacent pair of teeth of the internally toothed gear, an addendum portion of the external tooth makes a point of contact with an addendum portion of one of the adjacent pair of internal teeth, the point of contact changing position throughout at least part of the meshing relationship and being spaced equidistant between a point where the respective tooth centerline intersects the respective pitch line circle of the externally toothed gear and a point where the respective tooth centerline of the other tooth in contact therewith intersects the respective pitch line circle of the internally toothed gear.

FIG. 1 is a plan view with parts broken away illustrating one embodiment of the gear contours and showing the gear teeth approaching full meshing position;

FIG. 2 is a view similar to FIG. 1 and illustrating a different embodiment of the gear contours;

FIG. 3 is a view similar to FIG. 1 and illustrating a third embodiment of the gear contours.

Figure 4:
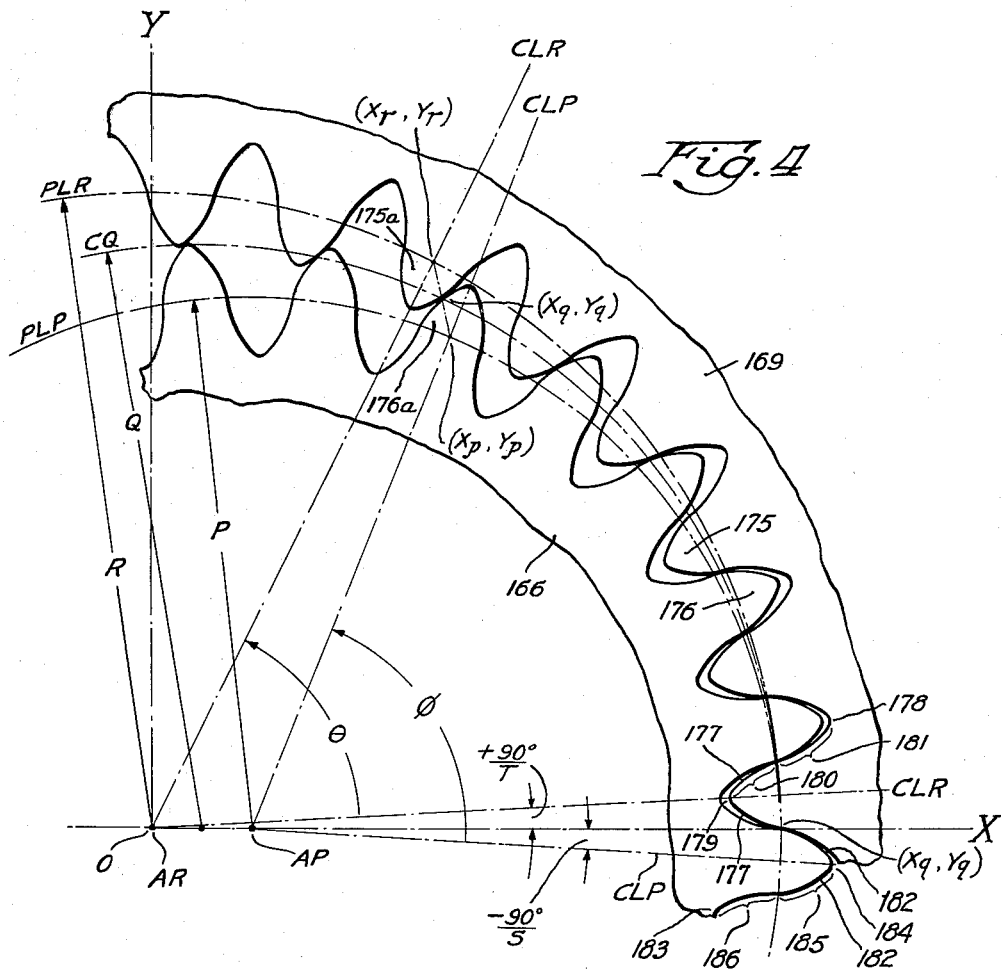
FIG. 4 is a view similar to FIG. 1 and illustrating the contour of the gear teeth.

Attention is directed to FIGURES 1, 2, 3, and 4 illustrating various gear contours for use in the embodiments of this invention. There is shown meshing portions external gears or pinions 166, 167 and 168 and internal or ring gears 169, 170 and 171, respectively, which form isolated pockets or chambers, indicated at 172, 173 and 174, respectively, which decrease in size as the respective pair of gears approach their full meshing positions and which pockets are isolated from one another to perform their fluid pressure functions. In each of the three embodiments of the gear illustrated in FIGURES 1, 2, 3 and 4, the contour of the gear teeth is so constructed that the pinion teeth do not "foul" with the internal gear teeth.

In each of the gear contour embodiments, it will be seen that the gear teeth begin to mesh with a tooth on the external gear or pinion contacting a tooth on the internal or ring gear, thus trapping fluid within a pocket formed with the next preceding gear teeth, and as the teeth gears rotate toward their full meshing positions; the external gear tooth will ride on the surface of the internal gear tooth, decreasing the volume of the pocket, but maintaining the pocket isolated from the preceding pocket or the succeeding pocket. This riding action of one tooth on another is smooth with no fouling therebetween.

With regard to the tooth form illustrated in FIGURES 1 and 4, it is possible to develop a similar tooth form by a mathematical approach. The basic premise for such a tooth form is that the contact points of the teeth in the "pumping" sector is half-way between the points formed by the intersection of the contacting tooth center lines and their respective pitch circles. The contact point is at the midway point of a line connecting the intersection of the ring gear pitch circle and tooth center line with the intersection of the pinion gear pitch circle and tooth center line when the gears are meshed and the tooth center lines are of contacting teeth. The following formulae represent one side of the addendum contour of the respective teeth; the other side of the tooth addendum is obtained by reversing the sign for the Y values. The dedendum portions of the teeth are generated from the addendum portions, so that no contact between addendum and dedendum portions of the teeth is possible.

As shown in FIG. 4, the reference letter R represents a radius of a pitch line circle PLR of the ring gear 169. The radius R extends from a point of origin O, representing the intersection of an axis of abscissas X with an axis of ordinates Y, to the pitch line circle PLR, the point O being superimposed on the axis AR of rotation of the ring gear 169. The reference letter P represents a radius of a pitch line circle PLP of the pinion gear 166. The radius P extends from the axis AP of rotation of the pinion gear 166 to the pitch line circle PLP of the pinion gear 166. The reference letter Q represents a radius of a circle CQ which passes through points (Xq, Yq) of contact that each tooth 175 of the ring gear 169 makes with a respective meshing tooth 176 of the pinion gear 166.

Each tooth 175 of the ring gear 169 has a pair of mirror edges 177 disposed on opposite sides of a tooth centerline CLR, each edge extending from a respective tooth gullet 178 to the tip 179 of the respective tooth 175. The edges 177 of each tooth 175 intersect each other at the centerline CLR. Each edge 177 comprises an addendum portion 180 and a dedendum portion 181. Each addendum portion 180 extends from the tip 179 of the respective tooth 175 to the respective dedendum portion 181, the dedendum portion 181 extending from the addendum portion 180 to the respective tooth gullet 178.

Similarly, each tooth 176 of the pinion gear 166 has a pair of mirror edges 182 disposed on opposite sides of a tooth centerline CLP whereby each edge 182 extends from a respective tooth gullet 183 to the tip 184 of the respective tooth 176 and intersects the other edge 182 at the centerline CLP. Each edge comprises an addendum portion 185 and a dedendum portion 186.

As shown in FIG. 4 the particular point (Xq, Yq) illustrating the point of contact between the tooth 175a of the ring gear 169 and the tooth 176a of the pinion gear is equidistant from a point (Xr, Yr), representing the point of intersection of the centerline CLR of the tooth 175a with the pitch line circle PLR, and a point (Xp, Yp), representing the point of intersection of the centerline CLP of the tooth 176a and the pitch line circle PLP. θ represents the angle through which the ring gear 169 rotates about the point O or axis AR of rotation to locate point (Xr, Yr) and φ represents the angle through which the pinion gear 166 rotates about its axis AP of rotation to locate point (Xp, Yp).

When both θ and φ equal zero, the Xq ordinate of the point of tooth contact (Xq, Yq) is substantially equal to the radius R and the Yq ordinate of the point (Xq, Yq) equals zero. Therefore, when the angles θ and φ are both equal to zero, the center line CLR of the respective tooth 175 of the ring gear 169 makes an angle of $$+\frac{90°}{T}$$

with the X axis, and the centerline CLP of the respective tooth 176 of the pinion gear makes an angle of $$-\frac{90°}{S}$$

with the X axis, where T equals the number of teeth 175 of the ring gear 169 and S equals the number of teeth 176 of the pinion gear 166. For example, since the angle included by the arc $2\pi R$ (the circumference of the ring gear 169) is equal to 360°, then the angle included between the centerline CLR, when the angle $\theta$ equals zero, and the X axis equals $$\frac{360°}{4T} \text{ or } \frac{90°}{T}$$

Therefore, the centerline CLR of the ring gear tooth 175a is at an angle $$\left(\theta+\frac{90°}{T}\right)$$

from the X axis, and the centerline CLP of the pinion gear tooth 175a is at an angle $$\left(\phi-\frac{90°}{S}\right)$$

from the X axis.

From the above, it can be seen that by simple trigonometry (1) $$Xr = R \cos\left(\theta+\frac{90}{T}\right)$$

(2) $$Yr = R \sin\left(\theta+\frac{90}{T}\right)$$

(3) $$Xp = P \cos\left(\phi-\frac{90}{S}\right)+(R-P)$$

(4) $$Yp = P \sin\left(\phi-\frac{90}{S}\right)$$

(5) $$Xq = Xr + \left(\frac{Xp-Xr}{2}\right) = \frac{1}{2}(Xr-Xp)$$

(6) $$Yq = Yp + \left(\frac{Yr-Yp}{2}\right) = \frac{1}{2}(Yr+Yp)$$

(7) $$\theta = \frac{P}{R}\phi$$

(8) $$\frac{T}{S} = \frac{R}{P}$$

By substituting the values for Xr and Xp in Equations 1 and 3 for Xr and Xp in Equation 5

(9) $$Xq = \frac{1}{2}\left[R \cos\left(\theta+\frac{90}{T}\right)+P \cos\left(\phi-\frac{90}{S}\right)+(R-P)\right]$$

and by substituting the value for Yr and Yp in Equations 2 and 4 for Yr and Yp in Equation 6

(10) $$Yq = \frac{1}{2}\left[R \sin\left(\theta+\frac{90}{T}\right)+P \sin\left(\phi-\frac{90}{S}\right)\right]$$

Therefore, the path of action for the teeth is the curve containing the points represented by the Equations 9 and 10 above.

If the axis is rotated to coincide with the centerline CLR of the ring gear tooth 175a, the Y axis being rotated with the X axis, then the angle B through which the X and Y axes are rotated is equal to $$\left(\theta+\frac{90}{T}\right)$$

Therefore, by substituting (9) and (10) in the following well known formulae for the rotation of axes

(11) $$X' = Y \sin B + X \cos B$$

(12) $$Y' = Y \cos B - X \sin B$$

it can be seen that

(13)
$$X'q = \frac{1}{2}\left[R \sin\left(\theta+\frac{90}{T}\right)\right.$$
$$+ P \sin\left(\phi-\frac{90}{S}\right)\left]\left[\sin\left(\theta+\frac{90}{T}\right)\right]+\frac{1}{2}\left[R \cos\left(\theta+\frac{90}{T}\right)\right.\right.$$
$$+ P \cos\left(\phi-\frac{90}{S}\right)+(R+P)\left]\left[\cos\left(\theta+\frac{90}{T}\right)\right]=\frac{1}{2}\left[R\right.\right.$$
$$+(R-P) \cos\left(\theta+\frac{90}{T}\right)+P \cos\left(\phi-\frac{90}{S}-\theta-\frac{90}{T}\right)\right]$$

and

(14)
$$Y'q = \frac{1}{2}\left[R \sin\left(\theta+\frac{90}{T}\right)\right.$$
$$+ P \sin\left(\phi-\frac{90}{S}\right)\left]\left[\cos\left(\theta+\frac{90}{T}\right)\right]-\frac{1}{2}\left[R \cos\left(\theta+\frac{90}{T}\right)\right.\right.$$
$$+ P \cos\left(\phi-\frac{90}{S}\right)+(R-P)\left]\left[\sin\left(\theta+\frac{90}{T}\right)\right]\right.$$
$$= \frac{1}{2}\left[P \sin\left(\phi-\frac{90}{S}-\theta-\frac{90}{T}\right)-(R-P) \sin\left(\theta+\frac{90}{T}\right)\right]$$

From Equations 7 and 8, the angle

(15) $$\left(\phi-\frac{90}{S}-\theta-\frac{90}{T}\right)=\left(\frac{R-P}{P}\theta-\frac{R+P}{P}\frac{90}{T}\right)$$

and, therefore, by substituting (15) in (13) and (14) above, the contour of the addendum portions 180 of each ring gear tooth 175 can be defined by the following formulae where the X axis is each tooth center line, the origin is the center of the gear, the Y axis is at right angles to the X axis and in the same plane.

(16)
$$X = \frac{1}{2}\left[R+(R-P) \cos\left(\theta+\frac{90}{T}\right)\right.$$
$$\left.+ P \cos\left(\frac{R-P}{P}\theta-\frac{R+P}{P}\frac{90}{T}\right)\right]$$

(17)
$$\pm Y = \frac{1}{2}\left[P \sin\left(\frac{R-P}{P}\theta-\frac{R+P}{P}\frac{90}{T}\right)\right.$$
$$\left.-(R-P) \sin\left(\theta+\frac{90}{T}\right)\right]$$

By following the same procedure in determining the contour of the addendum portions 180 of each ring gear tooth 175, the addendum portions 185 of each pinion gear tooth 176 can be developed by the following formulae, where the X axis is each tooth centerline, the origin is the center of the gear, the Y axis is at right angles to the X axis and in the same plane.

(18)
$$X = \frac{1}{2}\left[P-(R-P) \cos\left(\theta-\frac{90}{S}\right)\right.$$
$$\left.+ R \cos\left(\frac{R+P}{R}\frac{90}{S}-\frac{R-P}{R}\phi\right)\right]$$

(19)
$$\pm Y = \frac{1}{2}\left[(R-P) \sin\left(\phi-\frac{90}{S}\right)\right.$$
$$\left.+ R \sin\left(\frac{R+P}{R}\frac{90}{S}-\frac{R-P}{R}\phi\right)\right]$$

In the above Formulae 16, 17, 18, and 19:
R=pitch radius of the ring gear
P=pitch radius of the pinion gear
T=number of teeth in ring gear
S=number of teeth in pinion gear
θ=angle through which ring gear is rotated
φ=corresponding rotation angle of pinion gear
also:

$$\theta = \frac{R}{P}\phi \text{ and } T = \frac{R}{P}S$$

$\left(\theta + \frac{90}{T}\right)$=angular location of ring gear tooth centerline and:

$\left(\theta - \frac{90}{S}\right)$=corresponding angular location of pinion tooth centerline when the tooth contours are in contact. Angles are in degrees and are measured from the centers of the respective gears As previously described, the path of action for the above teeth is the curve containing the points represented by:

(9) $$X = \frac{1}{2}\left[R \cos\left(\theta + \frac{90}{T}\right) + P \cos\left(\phi - \frac{90}{S}\right) + (R-P)\right]$$

(10) $$Y = \frac{1}{2}\left[R \sin\left(\theta + \frac{90}{T}\right) + P \sin\left(\phi - \frac{90}{S}\right)\right]$$

where the X axis is the common centerline of the two gears, the origin is the center of the ring gear, angles $$\phi \text{ and } \frac{90}{T}$$

in degrees are from the X axis at the origin, angles $$\phi \text{ and } \frac{90}{S}$$

in degrees are measured from the X axis about the area measured from the X axis about the center of the pinion which at the point $X=(R-P)$, $Y=0$. Maximum values for the angles θ and φ are determined from the tooth contour formulae by setting $Y=0$ and solving for θ or φ.

For a gear tooth contour substantially as illustrated in FIGURE 1, $T$ minus $S$ is greater than 1 and less than 8.

While we have described our invention in connection with certain specific embodiments thereof, it is to be understood that there is by way of illustration and not by way of limitation and the scope of our invention is defined solely by the appended claims which should be construed as broadly as the prior art will permit.

We claim:

1. A pair of intermeshing gears, one of said gears being externally toothed and the other gear being internally toothed, said externally toothed gear being mounted eccentrically with respect to and within said internally toothed gear, each gear having a pitch line circle and a plurality of spaced teeth disposed about the respective pitch line circle, each tooth having a centerline and a pair of mirror edges defining the contour thereof and disposed on opposite sides of said centerline, each edge having a dedendum portion and an addendum portion, said teeth of said internally toothed gear being so constructed and arranged that each tooth thereof has the addendum portions defined by the formulae:

$$X = \frac{1}{2}\left[R + (R-P) \cos\left(\theta + \frac{90}{T}\right)\right.$$
$$\left. + P \cos\left(\frac{R-P}{P}\theta - \frac{R+P}{P}\frac{90}{T}\right)\right]$$

$$\pm Y = \frac{1}{2}\left[P \sin\left(\frac{R-P}{P}\theta - \frac{R+P}{P}\frac{90}{T}\right)\right.$$
$$\left. - (R-P) \sin\left(\theta + \frac{90}{T}\right)\right]$$

where the X axis is the axis of each tooth centerline, the origin is the center of the gear, the Y axis is at right angles to the X axis and in the same plane,
R=the pitch radius of said internally toothed gear,
P=the pitch radius of said externally toothed gear,
T=the number of teeth in said internally toothed gear,
θ=the angle through which said internally toothed gear is rotated, $\left(\theta + \frac{90}{T}\right)$= the angular location of said internally toothed gear tooth centerline, wherein said angles are in degrees and are measured from the centers of the respective gears whereby as each tooth of said externally toothed gear comes into meshing relation between an adjacent pair of teeth of said internally toothed gear, an addendum portion of said tooth of said externally toothed gear makes a point of contact with an addendum portion of one of said adjacent pair of teeth, said point of contact changing position throughout at least part of said meshing relation and being spaced equidistant between a point where the respective tooth centerline intersects the respective pitch line circle of said externally toothed gear and a point where the respective tooth centerline of the other tooth in contact therewith intersects the respective pitch line circle of the internally toothed gear.

2. A pair of gears as recited in claim 1 wherein the path of action for said gears is the curve containing points represented by the formulae:

$$X = \frac{1}{2}\left[R \cos\left(\theta + \frac{90}{T}\right) + P \cos\left(\phi - \frac{90}{S}\right) + (R-P)\right]$$

$$Y = \frac{1}{2}\left[R \sin\left(\theta + \frac{90}{T}\right) + P \sin\left(\phi - \frac{90}{S}\right)\right]$$

where:
φ=the corresponding rotational angle of said externally toothed gear,
S=the number of teeth in said externally toothed gear, $\left(\phi - \frac{90}{S}\right)$=the corresponding angular location of said externally toothed gear tooth centerline when said tooth contours are in contact.

3. A pair of intermeshing gears, one of said gears being externally toothed and the other gear being internally toothed, said externally toothed gear being mounted eccentrically with respect to and within said internally toothed gear, each gear having a pitch line circle and a plurality of spaced teeth disposed about the respective pitch line circle, each tooth having a centerline and a pair of mirror edges defining the contour thereof and disposed on opposite sides of said centerline, each edge having a dedendum portion and an addendum portion, said teeth of said internally toothed gear being so constructed and arranged that each tooth thereof has the addendum portions defined by the formulae:

$$X = \frac{1}{2}\left[R + (R-P) \cos\left(\theta + \frac{90}{T}\right)\right.$$
$$\left. + P \cos\left(\frac{R-P}{P}\theta - \frac{R+P}{P}\frac{90}{T}\right)\right]$$

$$\pm Y = \frac{1}{2}\left[P \sin\left(\frac{R-P}{P}\theta - \frac{R+P}{P}\frac{90}{T}\right)\right.$$
$$\left. - (R-P) \sin\left(\theta + \frac{90}{T}\right)\right]$$

and said teeth of said externally toothed gear being so constructed and arranged that each tooth thereof has the addendum portions defined by the formulae:

$$X = \frac{1}{2}\left[P - (R-P)\cos\left(\theta - \frac{90}{S}\right) + R\cos\left(\frac{R+P}{R}\frac{90}{S} - \frac{R-P}{R}\phi\right)\right]$$

$$\pm Y = \frac{1}{2}\left[(R-P)\sin\left(\phi - \frac{90}{S}\right) + R\sin\left(\frac{R+P}{R}\frac{90}{S} - \frac{R-P}{R}\phi\right)\right]$$

where the X axis is the axis of each tooth centerline, the origin is the center of the gear, the Y axis is at right angles to the X axis and in the same plane $R$ = the patch redius of said internally toothed gear,
$P$ = the pitch radius of said externally toothed gear,
$T$ = the number of teeth in said internally toothed gear,
$S$ = the number of teeth in said externally toothed gear,
$\theta$ = the angle through which said internally toothed gear is rotated,
$\phi$ = the corresponding rotational angle of said externally toothed gear, $\left(\theta + \frac{90}{T}\right)$ = the angular location of said internally toothed gear tooth centerline, $\left(\phi - \frac{90}{S}\right)$ = the corresponding angular location of said externally toothed gear tooth centerline when said tooth contours are in contact, wherein said angles are in degrees and are measured from the centers of the respective gears whereby as each tooth of said externally toothed gear comes into meshing relation between an adjacent pair of teeth of said internally toothed gear, an addendum portion of said tooth of said externally toothed gear makes a point of contact with an addendum portion of one of said adjacent pair of teeth, said point of contact changing position throughout at least part of said meshing relation and being spaced equidistant between a point where the respective tooth centerline intersects the respective pitch line circle of said externally toothed gear and a point where the respective tooth centerline of the other tooth in contact herewith intersects the respective pitch line circle of the internally toothed gear.

4. A pair of intermeshing gears as recited in claim 3 wherein the path of action for said gears is the curve containing points represented by the formulae:

$$X = \frac{1}{2}\left[R\cos\left(\theta + \frac{90}{T}\right) + P\cos\left(\phi - \frac{90}{S}\right) + (R-P)\right]$$

$$Y = \frac{1}{2}\left[R\sin\left(\theta + \frac{90}{T}\right) + P\sin\left(\phi - \frac{90}{S}\right)\right]$$

5. A pair of intermeshing gears, one of said gears being externally toothed and the other gear being internally toothed, said one gear being mounted eccentrically with respect to and within said other gear, each gear having a pitch line circle and a plurality of spaced teeth disposed about the respective pitch line circle, each tooth having a centerline and a pair of mirror edges defining the contour thereof and disposed on opposite sides of said centerline, each edge having a dedendum portion and an addendum portion, said gears being so constructed and arranged that as each tooth of said externally toothed gear comes into meshing relation between an adjacent pair of teeth of said internally toothed gear, an addendum portion of said tooth of said externally toothed gear makes a point of contact with an addendum portion of one of said adjacent pair of teeth, said point of contact changing position throughout at least part of said meshing relation and being spaced equidistant between a point where the respective tooth centerline intersects the respective pitch line circle of said externally toothed gear and a point where the respective tooth centerline of the other tooth in contact therewith intersects the respective pitch line circle of the internally toothed gear.

References Cited in the file of this patent
UNITED STATES PATENTS

| | | |
|---|---|---|
| Re. 21,316 | Hill | Jan. 9, 1940 |
| 1,497,050 | Wardwell | June 10, 1924 |
| 1,798,059 | Bilgram et al. | Mar. 24, 1931 |
| 1,833,993 | Hill | Dec. 1, 1931 |
| 2,053,919 | Pigott | Sept. 8, 1936 |
| 2,091,317 | Hill | Aug. 31, 1937 |
| 2,547,392 | Hill et al. | Apr. 3, 1951 |
| 2,601,397 | Hill et al. | June 24, 1952 |